United States Patent
Yamane

(10) Patent No.: US 7,416,003 B2
(45) Date of Patent: Aug. 26, 2008

(54) PNEUMATIC TIRE WITH TREAD SURFACE HAVING SPECIFIED DIRECTION OF ROTATION

(75) Inventor: Kenji Yamane, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 156 days.

(21) Appl. No.: 10/532,070

(22) PCT Filed: Nov. 27, 2003

(86) PCT No.: PCT/JP03/15185

§ 371 (c)(1), (2), (4) Date: Apr. 21, 2005

(87) PCT Pub. No.: WO2004/050389

PCT Pub. Date: Jun. 17, 2004

(65) Prior Publication Data
US 2006/0060277 A1    Mar. 23, 2006

(30) Foreign Application Priority Data
Dec. 3, 2002    (JP) .............................. 2002-351306

(51) Int. Cl.
*B60C 11/13* (2006.01)
(52) U.S. Cl. .......................... 152/209.15; 152/209.24; 152/209.27; 152/209.28
(58) Field of Classification Search ............ 152/209.15, 152/209.18, 209.24, 209.26, 209.27, 209.28
See application file for complete search history.

(56) References Cited

U.S. PATENT DOCUMENTS

| | | | | |
|---|---|---|---|---|
| 2,878,852 A | * | 3/1959 | Lippmann et al. | 152/209.2 |
| 3,768,535 A | * | 10/1973 | Holden | 152/209.24 |
| 5,152,854 A | * | 10/1992 | Matsumoto | 152/209.28 |
| 5,386,862 A | * | 2/1995 | Glover et al. | 152/209.24 |
| 5,526,858 A | * | 6/1996 | Ikeda | 152/209.24 |
| 5,996,661 A | * | 12/1999 | Gerresheim et al. | 152/209.28 |

(Continued)

FOREIGN PATENT DOCUMENTS

DE    4239475    *    5/1994

(Continued)

OTHER PUBLICATIONS

PCT International Search Report for PCT/JP03/15185 mailed on Mar. 9, 2004.

*Primary Examiner*—Steven D Maki
(74) *Attorney, Agent, or Firm*—Greer, Burns & Crain, Ltd.

(57) ABSTRACT

A tread surface the tire rotational direction of which is specified in one direction has a center region and shoulder regions on both sides of the center region. Blocks are defined in at least one of the shoulder regions by at least one first circumferential groove which extends in a circumferential direction of the tire, and first lateral grooves which extend in a widthwise direction of the tire and are disposed at predetermined intervals in the tire circumferential direction. Each block includes a tire rotational direction side groove wall surface having an inclination angle α, and a tire reverse rotation direction side groove wall surface having an inclination angle β, and the inclination angle β is greater than the inclination angle α. Each block has a tire rotational direction side edge portion which is chamfered.

7 Claims, 1 Drawing Sheet

U.S. PATENT DOCUMENTS

| | | | |
|---|---|---|---|
| 6,138,728 A | | 10/2000 | Miyazaki |
| 6,340,040 B1 * | | 1/2002 | Ikeda .................... 152/209.27 |
| 2002/0166615 A1 * | | 11/2002 | Gerresheim et al. .... 152/209.18 |
| 2006/0162831 A1 * | | 7/2006 | Ishida ................... 152/209.28 |

FOREIGN PATENT DOCUMENTS

| | | | | |
|---|---|---|---|---|
| EP | 602989 | * | 6/1994 |
| JP | 62-022103 | U1 | 2/1987 |
| JP | 62-026104 | * | 2/1987 |
| JP | 64-036505 | * | 2/1989 |
| JP | 02-141310 | * | 5/1990 |
| JP | 06-048122 | A1 | 2/1994 |
| JP | 6-166303 | * | 6/1994 |
| JP | 06-234305 | A1 | 8/1994 |
| JP | 6-270609 | * | 9/1994 |
| JP | 07-081323 | * | 3/1995 |
| JP | 07-164829 | A1 | 6/1995 |
| JP | 8-142613 | * | 6/1996 |
| JP | 11-091313 | A1 | 4/1999 |
| JP | 11-263104-A1. | | 9/1999 |
| JP | 2000-071718 | * | 3/2000 |
| JP | 2002-059711 | * | 2/2002 |

* cited by examiner

PNEUMATIC TIRE WITH TREAD SURFACE HAVING SPECIFIED DIRECTION OF ROTATION

TECHNICAL FIELD

The present invention relates to pneumatic tires, and more particularly, to a pneumatic tire capable of improving irregular wear created in running a circuit or the like where a large lateral acceleration is applied thereto during turning.

TECHNICAL BACKGROUND

Conventionally, there are proposed many pneumatic tires having a tread surface which is provided with a directional tread pattern the tire rotational direction of which is specified in one direction. In the pneumatic tires having such a directional tread pattern, there are pneumatic tires including a tread surface having circumferential grooves extending in a circumferential direction of the tire, and lateral grooves extending in a widthwise direction of the tire and disposed at given intervals in the tire circumferential direction to thereby define blocks in its shoulder regions (for example, see Unexamined Japanese Patent Application Publication No. 11-91313).

In recent years, circuit courses are opened up to general car users, and the users often have chances to make their cars run a circuit course. When running such a circuit course, a lateral acceleration acting during turning is much greater, compared with that in normal driving when running a public road, and irregular wear different from that in the normal driving is, therefore, created.

In the pneumatic tires having the above-mentioned directional pattern of blocks, the normal driving produces heel-and-toe wear such that the edge portions (stepping-in side edge portions), on a direction side of reverse rotation of the tire, of the blocks facing to the lateral grooves wear more slowly than the edge portions (kicking-out side edge portions) thereof on a direction side of rotation of the tire. Therefore, the inclination angles of the stepping-in side groove wall surfaces of the blocks are greater than the inclination angles of the kicking-out side groove wall surfaces thereof to increase rigidity of the stepping-in side edge portions, thereby suppressing heel-and-toe wear.

However, when running a circuit with such a tire, there is a problem of occurrence of irregular wear such that the kicking-out side edge portions of the blocks wear more slowly than the stepping-in side edge portions thereof.

DISCLOSURE OF THE INVENTION

An object of the present invention is to provide a pneumatic tire which can improve irregular wear produced in running a circuit or the like where a large lateral acceleration is applied thereto during turning, without degrading heel-and-toe wear resistance in normal driving.

In order to achieve the above object, a pneumatic tire according to present invention includes a tread surface having a direction of rotation of the tire which is specified in one direction, the tread surface having a center region and shoulder regions on both sides of the center region, blocks being defined in at least one of the shoulder regions by at least one first circumferential groove which extends in a circumferential direction of the tire and first lateral grooves which extend in a widthwise direction of the tire and are disposed at predetermined intervals in the tire circumferential direction, wherein each of the blocks has a tire rotational direction side groove wall surface and a tire reverse rotation direction side groove wall surface located back and forth in the tire rotational direction and facing to the first lateral grooves, the tire reverse rotation direction side groove wall surface having an inclination angle $\beta$ greater than the inclination angle $\alpha$ of the tire rotational direction side groove wall surface, each of the blocks having a tire rotational direction side edge portion which is chamfered.

According to the present invention described above, the inclination angle $\beta$ of the tire reverse rotation direction side groove wall surface of each block is greater to thereby make the kicking-out side edge portion thereof where wear grows slower due to a lower ground contact surface pressure higher in rigidity than the stepping-in side edge portion thereof, which allows for a more even distribution of ground contact pressure of the blocks in the shoulder region in running a circuit or the like where a large lateral acceleration acts during turning. Accordingly, irregular wear can be improved.

The tire rotational direction side edge portions are chamfered to make its rigidity greater, thereby allowing for an even distribution of ground contact pressure of the blocks in normal driving. Therefore, heel-and-toe wear can be suppressed.

BEST MODES FOR CARRYING OUT THE INVENTION

An embodiment of the present invention will be described in detail below with reference to the drawings.

Figure 1:
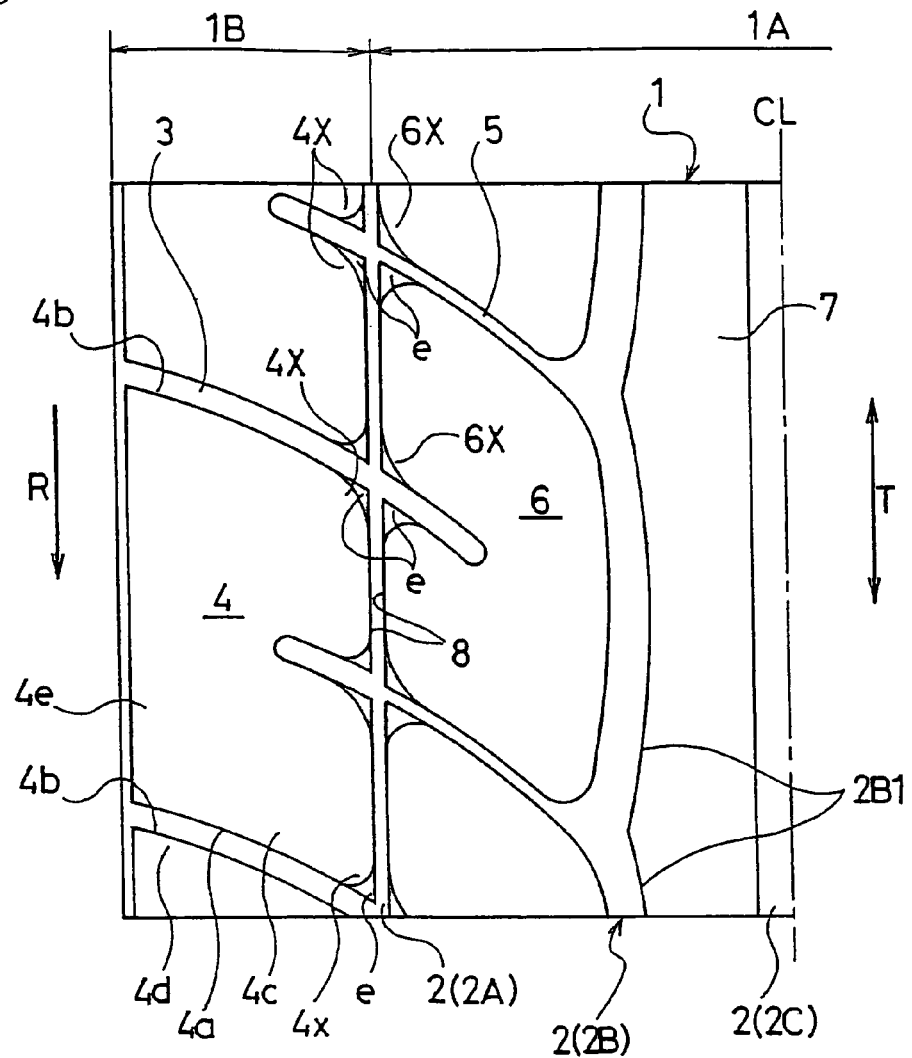
FIG. 1 is a partial development view showing an embodiment of a pneumatic tire according to the present invention, in which one side of the tread surface with respect to the centerline of the tire is developed.

Referring to FIG. 1, there is shown an embodiment of a pneumatic tire according to the present invention. Reference numeral 1 denotes a tread surface, and the rotational direction R of the tire is specified in one direction as shown by an arrow. The tread surface 1, which has a center region 1A and shoulder regions 1B on both sides of the center region, includes a plurality of circumferential grooves 2 extending along a circumferential direction T of the tir. The plurality of circumferential grooves 2 comprise a first circumferential grooves 2A disposed at a location defining the center region 1A and each of the shoulder regions 1B on both sides thereof, two second circumferential grooves 2B disposed on both sides of a centerline CL of the tire in the center region 1A, and a third circumferential groove 2C disposed on the tire centerline CL in the center region 1A.

Each first circumferential groove 2A extends straight along the tire circumferential direction T, and has a groove width which is the narrowest.

Each of the second circumferential grooves 2B extends in the tire circumferential direction T, and is composed of a plurality of circularly curved groove portions 2B1, which are convex towards the tire centerline CL and are connected to one another. Each of the groove portions 2B1 is in the form of a circular arc having a large radius of curvature, and each second circumferential groove is a so-called see-through groove, which can be seen through from one end to the other end of the second circumferential groove 2B when the tread surface 1 is fully developed. The second circumferential grooves 2B have a groove width which is greater than that of the first circumferential grooves 2A.

The third circumferential groove 2C extends straight along the tire circumferential direction T. The third circumferential groove is wider in groove width than each second circumferential groove 2B, and is the widest.

Disposed at predetermined intervals along the tire circumferential direction T are first lateral grooves 3 extending outward in a widthwise direction of the tire from each of the first circumferential grooves 2A so as to incline towards a direction of reverse rotation of the tire, and a plurality of blocks 4 are defined by the first circumferential grooves 2A and the first lateral grooves 3 in the shoulder regions 1B.

Disposed at predetermined intervals along the tire circumferential direction T are second lateral grooves 5 extending outward in the tire widthwise direction from each of the second circumferential grooves 2B so as to incline towards the tire reverse rotation direction, and a plurality of blocks 6 are defined by the circumferential grooves 2A and 2B, and the second lateral grooves 5 in the center region 1A. Ribs 7 extending along the tire circumferential direction T are formed between the circumferential grooves 2B and 2C.

Figure 2:
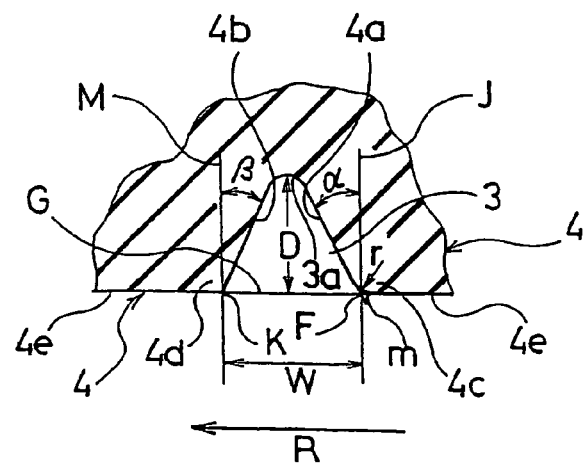
FIG. 2 is a partial enlarged cross-sectional view of the blocks taken along a circumferential direction of the tire.

The first lateral grooves 3 are displaced substantially one-half of the intervals from the second lateral groove 5, and are substantially centrally located between the second lateral grooves 5. The inner end side of each first lateral groove 3 extends into each block 6, and the inner terminal end thereof is located substantially centrally of each block 6. The first lateral grooves 3 has a bottom surface 3a which is formed as a curved surface in the form of a circular arc in cross section, as shown in FIG. 2.

The inner terminal end of each of the second lateral grooves 5 is in communication with a connecting part between the circularly curved groove portions 2B1. The outer end side of each second lateral groove 5 extends into each block 4 so as to cross and communicate with the first circumferential groove 2A, and the outer terminal end thereof is located within each block 4.

The corner portions 4X and 6X of the blocks 4, 6 facing to the first circumferential grooves 2A each have a groove wall edge section which is formed to have a chamfered face e in the form of a circular arc in cross section. The chamfered faces e are inclined such that the inclination angles thereof with respect to the tire radial direction are greater than those of the groove wall surfaces 8 of the blocks facing to the first circumferential grooves 2A, which increases rigidity of the block corner portions located in the areas where noise is apt to be created, thereby suppressing generation of noise due to slippage of the block corner portions.

Each of the blocks 4 in the shoulder regions 1B has a tire rotational direction side groove wall surface 4a and a tire reverse rotation direction side groove wall surface 4b located back and forth in the tire rotational direction R and facing to the first lateral grooves 3. As shown in FIG. 2, the inclination angle α (°) of the tire rotational direction side groove wall surface 4a and the inclination angle β (°) of the tire reverse rotation direction side groove wall surface 4b have a relationship represented by β>α, and the edge portion 4d (kicking-out side edge portion) of each block 4 on the tire reverse rotation direction side thereof has a greater rigidity than the side edge portion 4c (stepping-in side edge portion) thereof on the tire rotational direction side.

The edge of the tire rotational direction side edge portion 4c is cut off to have a chamfered face m in the form of a circular arc in cross section. The chamfered face m may be in the form of a straight line in cross section. In contrast, in this embodiment, the tire reverse rotational direction side edge portion 4d is not chamfered, as shown in FIG. 2.

It was very hard to learn the ground contact state of a tire when running a circuit in which a lateral acceleration acting during turning was much greater, compared with that in normal driving, before. However, with progress in hardware recently, the ground contact state of a tire has been possible to be simulated under such conditions. The simulation showed that a force acted substantially at a right angle to the tire during turning in a circuit, and the tread surface contacted with the ground with its ground contact shape being substantially of a triangle the top of which was located on the force acting side. The kicking-out side edge portions of the blocks 4 in the shoulder regions 1B were, therefore, lower in ground contact pressure than the stepping-in side edge portions thereof, and as a result, irregular wear such that the kicking-out side edge portions wore more slowly than the stepping-in side edge portions was created, different from that in normal driving.

Therefore, according to the present invention, the inclination angle β of the tire reverse rotation direction side groove wall surface 4b of each block 4 in the shoulder regions 1B is greater than the inclination angle α of the tire rotational direction side groove wall surface 4a thereof, as described above. This increases rigidity of the kicking-out side edge portions, which allows for an even distribution of ground contact pressure of the blocks 4 in running a circuit or the like where a great lateral acceleration acts during turning. Accordingly, irregular wear can be suppressed.

The tire rotational direction side edge portion 4c is chamfered to make its rigidity greater, thereby allowing for an even distribution of ground contact pressure of the blocks 4 during normal driving also. Thus, heel-and-toe wear can be suppressed.

In the present invention, the above-mentioned inclination angle α is preferably in the following range:

$$0.10 \times \tan^{-1}(2D/W) \leq \alpha \leq 0.75 \times \tan^{-1}(2D/W)$$

where D is the groove depth of the first lateral groove 3 in millimeters, and W is the groove width of the first lateral groove 3 in millimeters.

If the inclination angle α is below the lower limit, there is bad affection on heel-and-toe wear during normal driving. If the inclination angle α is beyond the upper limit, it is not preferable because the bottom surfaces 3a of the first lateral grooves 3 which are in the form of circular arcs in cross section are narrowed, whereby cracks are apt to occur in the bottom surfaces 3a and the groove areas decrease quickly as the blocks wear. The inclination angle α is desirably in the following range:

$$0.3 \times \tan^{-1}(2D/W) \leq \alpha \leq 0.5 \times \tan^{-1}(2D/W)$$

The above-mentioned inclination angle β is preferably in the following range:

$$\beta \leq 0.9 \times \tan^{-1}(2D/W)$$

If the inclination angle β is beyond the upper limit, the kicking-out side edge portions 4d of the blocks 4 are greater in rigidity and it is not preferable from the viewpoint of an even ground contact pressure distribution. More preferably, the inclination angle β is in the following range within the upper limit:

$$1.6\alpha \leq \beta \leq 2.0\alpha$$

The tire rotational direction side edge portions 4c of the blocks 4 preferably have a chamfered face m in the form of a circular arc in cross section as shown in the drawing. The curvature radius r of the chamfered face m is preferably in the range of 1 to 3 mm. If the curvature radius r is less than 1 mm, it is difficult to effectively suppress heel-and-toe wear in normal driving. If the curvature radius r is greater than 3 mm, it is difficult to improve irregular wear in running a circuit or the like because the edge portion 4c is greater in rigidity. Preferably, the curvature radius r is greater as the inclination angle α is smaller.

The inclination angle α referred in the present invention is, as shown in FIG. 2, an angle between the groove wall surface 4a and a straight line J which is orthogonal at an intersection F to a straight line G drawn between the intersection F and an intersection K, the intersection F being an intersecting point of the tire rotational direction side groove wall surface 4a and the ground contact surface 4e of the block 4 before chamfering, the intersection K being an intersecting point of the tire reverse rotation direction side groove wall surface 4b and the ground contact surface 4e of the block 4. The inclination angle β is an angle between the groove wall surface 4b and a straight line M which is orthogonal at the intersection point K to the straight line G.

The groove width W of the first lateral groove 3 is a length between the intersections F and K, and the groove depth D thereof is the length of a perpendicular line drawn to the straight line G from the bottom (the deepest position of the groove).

In the above embodiment, the present invention shows a pneumatic tire also having blocks 6 in the center region 1A, but is not limited thereto. The present invention is preferably applicable to any of pneumatic tires having blocks 4 in at least one shoulder region 1B of the tread surface 1 and a tire rotational direction R specified in one direction.

The present invention is preferably applicable to pneumatic tires for passenger cars, especially employed for high performance vehicles with a large engine size.

EXAMPLE

Tires according to the present invention, comparison and prior art were prepared, respectively, having a tire size of 235/45ZR17 and a tread pattern shown in FIG. 1; the present invention tires were formed such that the inclination angle β of the tire reverse rotation direction side groove wall surface of each of the blocks in the shoulder regions was greater than the inclination angle α of the tire rotational direction side groove wall surface thereof, and the tire rotational direction side edge portion thereof had a chamfered face in the form of a circular arc; the comparison tires had the same constructions as the present invention tires except that the tire rotational direction side edge portions had no chamfered face; the prior art tires had the same constructions as the comparison tires except that the inclination angle α was greater than the inclination angle β.

In the present invention tires, the inclination angle α was equal to $0.30 \times \tan^{-1}(2D/W)$, the inclination angle β was equal to $0.85 \times \tan^{-1}(2D/W)$ and the curvature radius r of the chamfered face was 3 mm. In the prior art tires, the inclination angle α was 6 degrees and the inclination angle β was 2 degrees.

The test tires were seated on 17×8JJ sized rims, inflated to an air pressure of 200 kPa, and mounted on a passenger car of 3 liter displacement; the evaluation tests for heel-and-toe wear resistance in normal driving and irregular wear resistance when a large lateral acceleration acted thereupon were performed in the following measurement methods, obtaining the results shown in Table 1.

Heel-and-toe Wear Resistance

The car was run on a public road a distance of 4000 km, and then the remaining amounts of the opposing edge portions of respective adjacent blocks in the shoulder regions were measured in 0.5 mm intervals with the measurement value within the interval rounded up, and the maximum value of the differences between the remaining amounts of the opposing edge portions was employed as the amount of heel-and-toe wear.

Irregular Wear Resistance

The car was run on a dry asphalt road surface, drawing a figure-8 with a lateral acceleration acting upon the car being 0.8 G, and after repeating it 500 times, the amount of irregular wear was measured as described above.

TABLE I

|  | Prior Art Tire | Present Invention Tire | Comparison Tire |
|---|---|---|---|
| Heel-and-toe wear Resistance (mm) | 0.5 | 0.5 | 1.5 |
| Irregular Wear Resistance (mm) | 2.0 | 0.5 | 0.5 |

As can be seen from Table 1, the amount of heel-and-toe wear and the amount of irregular wear according to the present invention tires are 0.5 mm, respectively, and the present invention tires can improve irregular wear resistance while maintaining heel-and-toe wear resistance equivalent to the prior art tire.

As having been illustrated above, according to the present invention, the inclination angles β of the tire reverse rotation direction side groove wall surfaces of the blocks were greater than the inclination angles α of the tire rotational direction side groove wall surfaces thereof in the shoulder regions of the tread surface the tire rotational direction of which is specified in one direction, and the tire rotational direction side edge portions of the blocks are chamfered, whereby irregular wear created in running a circuit or the like where a great lateral acceleration is applied thereto during turning can be improved without degrading heel-and-toe wear resistance in normal driving.

INDUSTRIAL APPLICABILITY

The present invention having the aforementioned excellent effects is very effectively applicable to pneumatic tires which are also employed when general car users make their cars run a circuit or the like in which a large lateral acceleration is applied thereto during turning.

What is claimed is:

1. A pneumatic tire having a tread surface having a direction of rotation of the tire which is specified in one direction, the tread surface having a center region and shoulder regions on both sides of the center region, blocks being defined in at least one of the shoulder regions by at least one first circumferential groove which extends in a circumferential direction of the tire and first lateral grooves which extend in a widthwise direction of the tire and are disposed at predetermined intervals in the tire circumferential direction, wherein each of the blocks has a tire rotational direction side groove wall surface and a tire reverse rotation direction side groove wall surface located respectively in a front and a back of each block in the tire rotational direction and facing the first lateral grooves, the tire reverse rotation direction side groove wall surface having an inclination angle β with respect to the radial direction greater than an inclination angle α with respect to a radial direction of the tire rotational direction side groove wall surface, and each of the blocks also has a tire rotational direction side edge portion which is chamfered, and a tire reverse rotation direction side edge portion that has greater rigidity than the tire rotational direction side edge portion;

wherein the first circumferential groove is disposed between the center region and the at least one shoulder region;

wherein the tread surface has two first circumferential grooves, each of the first circumferential grooves being disposed between the center region and each of the shoulder regions, the first lateral grooves extending outwardly in the tire widthwise direction from each first circumferential groove so as to incline towards the tire reverse rotation direction;

wherein two second circumferential grooves extending in the tire circumferential direction are provided on both sides of a centerline of the tire in the center region, and wherein second lateral grooves extending outwardly in the tire widthwise direction from each of the second circumferential grooves so as to incline towards the tire reverse rotation direction are disposed at predetermined intervals in the tire circumferential direction, blocks being defined by the first circumferential grooves, the second circumferential grooves and the second lateral grooves;

wherein each of the second circumferential grooves is composed of a plurality of circularly curved groove portions which extend in the tire circumferential direction, the groove portions being convex towards the tire centerline and connected to one another; and wherein a third circumferential groove extending in the tire circumferential direction is provided on the tire centerline, a rib being defined between the third circumferential groove and each of the second circumferential grooves.

2. A pneumatic tire according to claim 1, wherein the inclination angle β fulfills the following relationship:

$$1.6\alpha \leq \beta \leq 2.0\alpha, \text{ and}$$

wherein the tire rotational direction side edge portions of the blocks are chamfered in the form of circular arcs having a curvature radius of 1 to 3 mm.

3. A pneumatic tire according to claim 1, wherein the second lateral grooves extend outwardly in the tire widthwise direction beyond the first circumferential groove from the connecting parts of the circularly curved groove portions.

4. A pneumatic tire according to claim 1, wherein the second lateral grooves are displaced substantially one-half of the intervals from the first lateral grooves.

5. A pneumatic tire according to claim 1, wherein the first lateral grooves extend into the blocks in the center region.

6. A pneumatic tire according to claim 1, wherein the third circumferential groove has a groove width greater than that of each second circumferential groove, and wherein each first circumferential groove has a groove width smaller than that of each second circumferential groove.

7. A pneumatic tire according to claim 1, wherein the tire reverse rotation direction side edge portion is not chamfered.

* * * * *